June 2, 1953   R. B. BUCHNER   2,640,883
MARKER CONTROL ARRANGEMENT FOR SELECTORS
Filed July 29, 1949
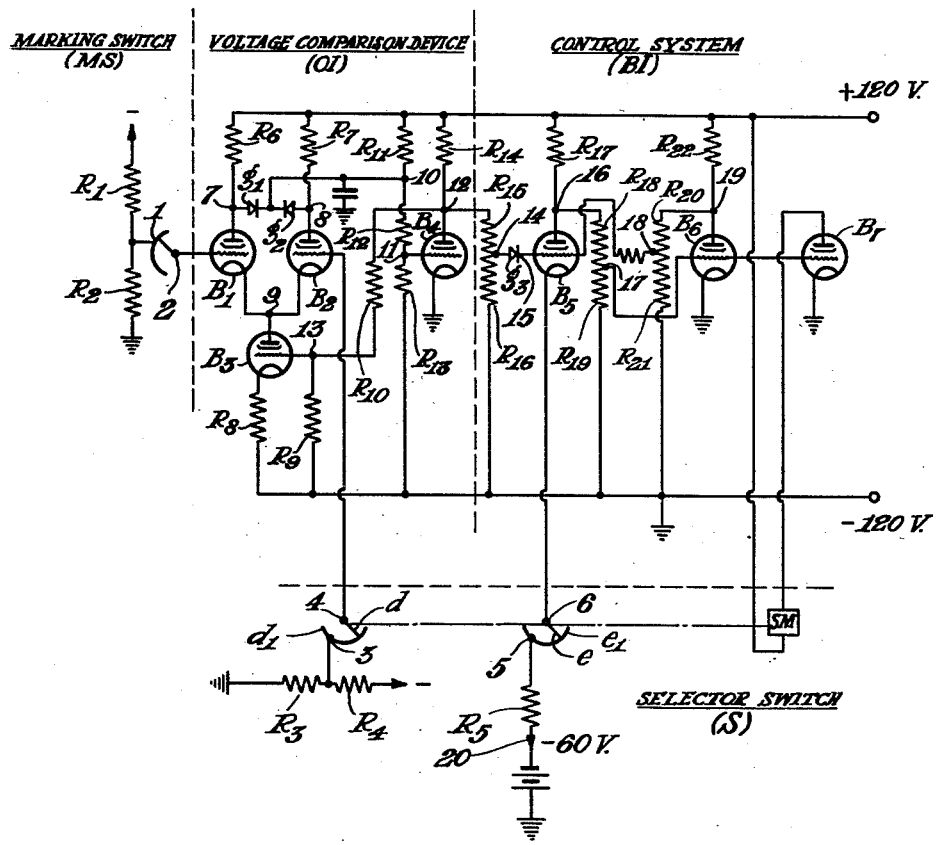
INVENTOR.
ROBERT BERTOLD BUCHNER.
BY
AGENT.

Patented June 2, 1953

2,640,883

UNITED STATES PATENT OFFICE 2,640,883

MARKER CONTROL ARRANGEMENT FOR SELECTORS

Robert Bertold Buchner, Eindhoven, Netherlands, assignor to Hartford National Bank and Trust Company, Hartford, Conn., as trustee Application July 29, 1949, Serial No. 107,412
In Holland September 11, 1948

3 Claims. (Cl. 179—18)

This invention relates to control arrangements for use in automatic signalling systems, for example an automatic telephone system, for numerical adjustment of a switch.

Automatic telephone systems are known, in which switches, for example call finders or selectors, are numerically adjusted under the control of a register according to a voltage-comparison method, contacts in the outlets of the switch over which a definite wiper is adapted to pass being marked by an electrical state which is characteristic for the outlet concerned. Thus, for example, alternating voltages having a different phase, frequency or amplitude for different numerical indications or alternatively direct voltages of different values may be supplied to the said contacts.

By means of a test device associated with the register, the voltages of the contacts successively passed over by the wiper are compared with a comparison voltage stored in the register in accordance with the number to be selected. As soon as a free outlet is reached, the marking voltage of which has desired relationship with the comparison voltage, the switch is arrested under the action of a control device of the register and the outlet concerned is marked engaged, so that a further switch cannot be arrested at a corresponding outlet.

In certain systems, busy outlets are distinguished from free outlets either by changing the marking voltage into a voltage which does not correspond to the number criterion upon engagement of the outlet, or by neutralising this voltage, for example by connecting the numerical marking contact to earth.

In other systems, busy outlets are indicated with the use of a series of contacts over which a separate wiper passes the contacts of free outlets exhibiting a definite, generally negative potential which is different from that of busy contacts, the potential of which is generally higher and may be equal to earth potential.

The control arrangement according to the invention may be used for the numerical adjustment of switches of which a wiper, during the movement of the switch, passes over contacts which, if the corresponding outlet is free, exhibit a potential which exceeds the potential of busy outlets.

The potential of free contacts may have different values to indicate different numerical criteria. In a further use, the numerical indications are tested through a separate wiper of the switch. It is furthermore possible to define the numerical criterion in a different manner by the register, for example in accordance with the number of pulses returned to the register during the movement of the wiper from a fixed zero position.

In the control arrangement according to the invention, the engagement of a desired free outlet upon the switch reaching this outlet, is effected by electronic means so that the risk of a second switch stopping at a corresponding outlet is materially reduced.

According to the invention a control arrangement for use in an automatic signalling system for the adjustment, in accordance with a numerical criterion, of a switch, of which a wiper passes over contacts during the movement of the switch, the contacts having a direct voltage potential when the corresponding outlet is free, which potential is lower than the potential of contacts of busy outlets, and the control device comprising a testing device which tests the numerical criteria of the outlets and responds when an outlet corresponding to the numerical criterion is reached, is characterised in that the wiper upon switching on the control arrangement is connected to the cathode of a first discharge tube, of which a control-electrode is coupled with a first point, of which the potential depends upon the response or non-response of the testing device and with a second point of an output circuit of a second discharge tube, in such manner that the potential of control-electrode of the first discharge tube becomes equal to the potential of either the first or second point whichever is the higher which first and second points, upon switching on the device and non-response of the testing device, have a negative potential relative to the cathode of this first tube such that the first tube is cut-off, and furthermore a control-electrode of the second tube is connected to a third point of an output circuit of the first tube in such manner that, if the first tube is cut-off, the second tube becomes conductive and vice versa, the potential of fourth point upon response of the testing device, rising to a degree such that, if the outlet concerned is busy, the first tube remains cut-off, but if the outlet is free, the first tube becomes conductive, in which latter case the potential of the control-electrode of the first tube, owing to the second tube being cut-off rises to a degree such that the current passed by the first tube becomes maximal and the potential of the contact connected to the wiper is made substantially equal to or higher than the potential of contacts of busy outlets, provision being furthermore made of means which respond to cutting-off of the second tube or to the first tube becoming conductive and arrest the movement of the switch.

In order that the invention may be more clearly understood and readily carried into effect, it will now be described more fully with reference to the accompanying diagrammatic drawing, in which one embodiment thereof is represented by way of example.

The adjustment of a selector switch S, of which the drawing shows only the wipers $d$ and $e$, the associated series of contacts $d^1$ and $e^1$, and the arresting magnet SM, to a desired free outlet is effected under the control of a control-device BI with the use of a voltage-comparison method.

The contacts $d^1$ have a negative direct voltage potential which is characterised for the outlet concerned. These marking potentials may, for example, be taken from a common potentiometer $R_3, R_4$ which is connected between earth and a point of negative potential. If the switch S is a group selector, the contacts of the outlets corresponding to the same number will, as is known, all have the same potential.

The contacts $e^1$ are connected by way of resistance $R_5$ to a point 20 having a negative potential of, say —60 volts. If an outlet is engaged the $e$-contact, owing to the response of a busy relay, is connected to earth in a manner not shown in detail. Consequently the $e$-contacts of free outlets are marked by a negative potential, whereas the contacts of busy outlets are at earth potential.

The switch S is required to be adjusted to a free outlet, of which the $d$-contact has a potential which is equal to the potential of the contact 1, to which a marking switch MS in the register is adjusted in accordance with the number to be chosen. The potentials of the contacts of the marking switch are taken from a potentiometer $R_1, R_2$. The comparison of the potentials of the $d$-contacts of the selector switch S with the marking voltage in the register takes place during the movement of the switch with the use of a voltage-comparison device OI associated with the control-device. In the embodiment shown, the comparison device is of a kind as described in the copending U. S. application S. N. 107,411, filed July 29, 1949.

Any suitable known voltage-comparison device may, however, be used desired.

The voltage-comparison device comprises two tubes $B_1$ and $B_2$, the common cathode circuit of which is connected at a point 9 to the anode of a third tube $B_3$ having a high internal resistance. Upon switching on the control-device the control-grids of tubes $B_1$ and $B_2$ are connected, in a manner not further shown, to the wiper 2 of the marking switch MS and to the $d$-wiper of the selector switch S respectively.

The anodes of $B_1$ and $B_2$ are fed through equal resistances $R_6, R_7$ and are furthermore connected, by way of rectifiers $g_1, g_2$, to a point 10 of a potentiometer consisting of resistances $R_{11}, R_{12}, R_{13}$. The supply circuits of the screen-grids of the various tubes are not shown in the drawing.

Owing to the current negative feed-back due to a resistance $R_8$ in the cathode circuit of the tube $B_3$ the resistance formed by the tube $B_3$ has a high value such that the total emission current of tubes $B_1$ and $B_2$ is practically independent of the potentials of the control-grids of these tubes.

If the potentials of the control-grids are equal, the anodes of $B_1, B_2$ consequently have a practically fixed potential. With equal potentials of the control-grids of tubes $B_1$ and $B_2$, the potential of the point 10 exceeds the potentials of points 7 and 8, the rectifiers $g_1$ and $g_2$ being cut off. The control-grid of a fourth tube $B_4$ is connected to a second tapping point 11 of the potentiometer $R_{11}, R_{12}, R_{13}$. As long as the rectifiers $g_1$ and $g_2$ are cut off, the control-grid of the tube $B_4$ has a negative potential with respect to the cathode of the tube $B_4$ such that the tube $B_4$ is just cut off.

The anode of $B_4$ is fed by way of a resistance $R_{14}$. The control-grid of tube $B_3$ is connected to the tapping point 13 of a potentiometer $R_9, R_{10}$ connected between the anode of the tube $B_4$ (point 12) and the negative terminal of the supply.

The circuit-arrangement operates as follows. As long as the wiper $d$ passes over contacts, of which the potential does not correspond to the comparison voltage in the register, one of the anodes of tubes $B_1, B_2$ has a potential exceeding the normal potential of point 10. If, for example, the potential of a $d$-contact is lower than the comparison voltage, the anode current of $B_2$ is lower than that of $B_1$. The voltage at point 8 then exceeds the normal potential of point 10 and since the rectifier $g_2$ is conductive, the potential of point 10 will also exceed the normal potential of point 10. The potential of point 11 is such that tube $B_4$ is conductive. Owing to the voltage drop across resistance $R_{14}$, the anode of $B_4$ has a comparatively low potential.

As soon as a $d$-contact is reached, of which the potential corresponds to the comparison voltage in the register, the potential of points 8, 10 and 11 drops and the current passing through tube $B_4$ becomes less. Consequently, the potential of point 12 rises, which involves an increase in potential of the control-grid of tube $B_3$ so that this tube passes more current. This results in that the voltage drop at point 8 increases and tube $B_4$ is abruptly cut off and the potential of the anode of $B_4$ rises very rapidly. The switch must, however, be stopped at such an outlet only if this outlet is free. The control-device BI is arranged such that the switch is stopped only if point 12 can assume a comparatively high potential (i. e. when an outlet corresponding to the desired number has been reached) and the potential of the $e$-contact is sufficiently negative to indicate that the outlet reached is free.

The control-arrangement BI comprises three tubes $B_5, B_6$ and $B_7$, the anodes of tubes $B_5$ and $B_6$ being fed by way of resistances $R_{17}$ and $R_{22}$ respectively. Upon switching on the control-arrangement, means (not shown) connect the $e$-wiper of the switch S to the cathode of tube $B_5$, and the arresting magnet SM for arresting the switch S is connected in the anode circuit of a seventh tube $B_7$.

The control-grids of tubes $B_6$ and $B_7$ are connected to a point 17 of a voltage divider $R_{18}, R_{19}$ connected between the anode of tube $B_5$ (point 16) and the negative terminal of the supply. Tubes $B_6$ and $B_7$ are conductive if tube $B_5$ is cut off, and tubes $B_6$ and $B_7$ are cut off if tube $B_5$ is conductive.

At the instant of switching on the control arrangement the tube $B_5$ is cut off, so that tube $B_7$ is conductive and the arresting magnet SM is energized. Between the anodes of tubes $B_4$ and $B_6$ and the negative terminal of the supply are connected voltage dividers $R_{15}, R_{16}$ and $R_{20}, R_{21}$, respectively. The control grid of tube $B_5$ is coupled by way of a rectifier $g_3$, with a point 14 of the voltage divider $R_{15}, R_{16}$ and by way of a high resistance, with a point 18 of the voltage divider $R_{20}$, $R_{21}$.

This coupling is such that the control-grid of tube $B_5$ (point 15) assumes the higher of the potentials of points 14 and 18. If, for example, the potential of point 18 exceeds that of point 14, the rectifier $g_3$, is cut off and point 15 follows the potential of point 18. If, on the contrary, point 18 has a lower potential than point 14, the control-grid of $B_5$ is connected to point 15 through the internal resistance of the rectifier, which, in the conductive state is low with respect to the high resistance.

An exactly similar effect is obtained, if the rectifier 15 and the high resistance are interchanged.

If tubes $B_4$ and $B_6$ are conductive and if the cathode of tube $B_5$ is connected to a voltage of —60 volts the control-grid of tube $B_5$ is negative with respect to its cathode, such that tube $B_5$ is cut off. Consequently, the tube $B_5$ will certainly be cut off if the cathode of tube $B_5$ has a potential exceeding —60 volts, for example when a busy outlet is found.

As long as the $d$-wiper of the switch passes over contacts of outlets which do not correspond to the desired number criterion, tube $B_4$ remains conductive. When the $d$-wiper reaches a contact, of which the voltage is equal to the comparison voltage in the register, tube $B_4$ is cut off, the potential of point 14 thus rises to a value between 0 and —60 volts such that, if the cathode of tube $B_5$ is connected to an earthed $e$-contact through the $e$-wiper of the switch S, the potential of the control-grid of tube $B_5$ has a negative potential relatively to its cathode such that tube $B_5$ remains cut off but, if the $e$-contact has a potential of —60 v., tube $B_5$ becomes conductive.

Consequently, if a desired outlet appears to be a busy tube $B_5$ remains cut off and $B_7$ conductive, so that the wipers $d$ and $e$ move on. If, however, the outlet is free, tube $B_5$ becomes conductive, so that the potential of point 16 and consequently also that of point 17 are reduced, the current passed by tube $B_6$ decreasing due to which the potential of point 18 exceeds the potential of point 14 and tube $B_5$ passes more current. This results in that tube $B_6$ is completely cut off and, owing to the further rise of potential of point 18 the current passed by tube $B_5$ becomes maximal and the potential of the cathode of tube $B_5$, owing to the voltage drop across resistance $R_5$, is reduced substantially to earth potential, so that the outlet of the switch S is engaged.

Tube $B_7$ is cut off simultaneously with tube $B_6$ so that the arresting magnet SM is demagnetized and the switch S is stopped.

The whole process occupies such a short time that if after an interval of a few microseconds a second switch, reaches a corresponding outlet, the control-arrangement of the second switch finds earth potential at the $e$-contact of this outlet and this switch does not stop.

After the switch has stopped, a busy relay (not shown) of the switch is energized from the register, so that the $e$-contact of the switch S connected to earth for the duration of the call and the connection between the $e$-contact and the cathode of tube $B_5$, and the energizing circuit of the arresting magnet SM are interrupted. Tube $B_5$ is thus cut off, so that the control-arrangement is again brought into a condition in which it is capable of controlling a switch in a next following selector stage.

If the switch is required be adjusted with the use of a voltage-comparison method according to which upon engagement of an outlet, the numerical marking potential is neutralized or increased to a value not corresponding to a numerical criterion, a similar control-arrangement may be used. In this system, it is consequently not investigated by way of a separate wiper whether an outlet is free or busy.

In this case, the cathode of tube $B_5$ is connected to the $d$-wiper of the switch S, to which an input of the voltage-comparison device is connected. In this system, the marking potentials of the $d$-contacts must not be taken directly from a potentiometer common to all contacts, since otherwise the potentials of the other contacts would be disturbed upon engagement of an outlet. In a known system each contact is associated with a separate potentiometer.

The adjustment of the switch is performed in a manner entirely similar to the previous case. It is to be noted that, after the switch S has reached the desired free outlet and the voltage-comparison device has responded by making tube $B_5$ conductive the voltage at the $d$-contact is increased to a value which does not correspond to a numerical criterion.

At this instant, potential equilibrium no longer exists between points 1 and 2, so that in the voltage-comparison device, tube $B_4$ again becomes conductive and the potential of point 14 is restored to a high value. This, however, does not result in that tube $B_5$ is again cut off, since by cutting off tube $B_6$ point 18 has assumed a high potential.

What I claim is:

1. In an automatic signalling system: the combination comprising a call selector including first and second switches each having a series of contacts, an arm for successively engaging said contacts and means for concurrently actuating the arms of said switches, means for impressing on each contact of said first switch a potential whose value is representative of its numerical position, and means for impressing on each contact of said second switch a potential whose value relative to ground is indicative of whether the call selector is free or busy, the potential in the free condition being low relative to that in the busy condition; a marking potential source; a testing device coupled to the arm of said first switch and coupled to said source to compare the potential on said arm with said marking potential to produce at a point in said device a test potential having a predetermined value when the compared potentials are equal and an other value when the compared potentials differ; and a control system including first and second electron discharge tubes having a cathode, a grid and an anode, means connecting the cathode of the first tube to the arm of the second switch, means connecting the cathode of the second tube to ground, first and second output impedances connected between the anode of said first and second tubes respectively and ground, means combining said test potential and the potential established at a prescribed point in said second output impedance and applying the resultant potential to the grid of said first tube in a manner at which the resultant grid potential is equal to the higher of the two combined potentials and at which the resultant grid potential at the predetermined test potential value relative to the cathode potential of the first tube at the free condition potential thereof renders the first tube conductive but at the other relative values maintains same non-conductive, means connecting the grid of the second tube to a prescribed point in the output impedance of the first tube presenting a potential at which said second tube is rendered conductive when said first tube is non-conductive and is rendered non-conductive when said first tube is conductive, and means responsive to the conduction of said first tube to arrest the actuation of said switches.

2. An arrangement, as set forth in claim 1, wherein said means to combine said test potential developed at a point in the test device and the potential developed at a point in the second output impedance includes a rectifier connected between one of the two points and the grid of said first tube and a resistance connected between the other of said points and the grid of said first tube.

3. An arrangement, as set forth in claim 1, wherein said means to actuate the arms is constituted by an electromagnet, and said means responsive to the conduction of said first tube includes a third electron discharge tube having a cathode, a grid and an anode, the grid of the third tube being connected to the grid of the second tube, and means to apply a direct voltage between the cathode and anode of the third tube through said electromagnet.

ROBERT BERTOLD BUCHNER.

References Cited in the file of this patent

UNITED STATES PATENTS

| Number | Name | Date |
|---|---|---|
| 2,380,950 | Deakin | Aug. 7, 1945 |
| 2,419,540 | Deakin | Apr. 29, 1947 |
| 2,454,781 | Deakin | Nov. 30, 1948 |
| 2,454,809 | Kruithof et al. | Nov. 30, 1948 |
| 2,462,074 | Deakin | Feb. 22, 1949 |